United States Patent [19]

Strait

[11] 4,206,510
[45] Jun. 3, 1980

[54] AUTOMATIC DETECTION AND CLASSIFICATION DEVICE

[75] Inventor: Robert D. Strait, San Diego, Calif.

[73] Assignee: The United States of America as represented by the Secretary of the Navy, Washington, D.C.

[21] Appl. No.: 518,425

[22] Filed: Jun. 27, 1955

[51] Int. Cl.² .............................................. G01S 09/66
[52] U.S. Cl. ....................................... 367/94; 367/97; 367/98; 367/901; 367/904
[58] Field of Search ................. 340/3, 16; 367/94, 97, 367/98

[56] References Cited

U.S. PATENT DOCUMENTS

| | | | |
|---|---|---|---|
| 2,431,854 | 12/1947 | Wood | 340/3 |
| 2,566,858 | 9/1951 | Sebring | 340/16 |
| 2,583,531 | 1/1952 | Hathaway | 340/16 |
| 2,684,471 | 7/1954 | Hiller | 340/3 |

*Primary Examiner*—Richard A. Farley
*Attorney, Agent, or Firm*—R. S. Sciascia; Sol Sheinbein

EXEMPLARY CLAIM

1. In an automatic echo ranging system wherein sonar equipment transmits pulses toward a target in predetermined and equal time intervals and receives background, dopplered and undopplered echoes which are produced as video output and audio output, the improvement comprising a gain circuit for controlling the amplitude of the video and audio output, which includes a video channel for the video output of the receiver having a first variable amplifier and means for producing a first bias voltage which is proportional to the video signal voltage, an audio channel for the audio output of the receiver including a second variable amplifier and means for producing a second bias voltage which is proportional to the audio channel signal voltage, said first bias voltage from the video signal being received by said second variable amplifier in the audio channel and said second bias voltage from the audio channel being received by the first variable amplifier in the video channel, a band pass filter and a band rejection filter for the audio output from the second variable amplifier to provide an undopplered signal voltage channel and a dopplered signal voltage channel, classifier means for the dopplered channel and the undopplered channel, said classifier means including means for rectifying, and means for filtering the signals from each channel to remove high frequencies, means for passing a signal above a predetermined amplitude, a wave shaper, a differentiator for the output of the wave shaper to produce a positive and negative pulse from one echo from a target, a first rectifier and a first normally open gate for passage of the positive pulse of the one echo, a second rectifier for passing the negative pulse of the one echo, a second normally closed gate, a maximum pulse length circuit operative by the positive pulse of the one echo to open the second gate for a predetermined time to pass the negative pulse of the one echo, a minimum pulse separation circuit operative by the negative pulse of the one echo to close said first gate for a predetermined maximum range interval of the next echo from the target, a third normally closed gate, a maximum pulse separation circuit operative by the negative pulse of the first echo to open the third gate for the maximum range interval of said next echo from the target, and a relay signal circuit operated when the negative pulse of said next echo from the target passes the third gate to indicate that a target has minimum been located.

2 Claims, 7 Drawing Figures

AUTOMATIC DETECTION AND CLASSIFICATION DEVICE

The invention described herein may be manufactured and used by or for the Government of the United States of America for governmental purposes without the payment of any royalties thereon or therefor.

This invention relates to automatic detection and classification devices and more particularly to such devices, hereinafter referred to as ADAC, having a gain loop providing a more constant amplitude at its output, a heterodyne correlator to attenuate noise burst other than the transmitted sonar pulses and to provide for utilization of circuits having greater simplicity, reliability, and efficiency.

The apparatus of this invention is an improvement over the ADAC invention of Miller et al, Ser. No. 439,941, filed June 28, 1954. The Miller et al ADAC as well as Applicant's device provides a system for the automatic detection and classification of sonar echoes and is used as a sonar equipment monitor as an aid in the study of detection and classification of active sonar signals and provides a standard of operator performance of these tasks. It is designed to be used with scanning sonar equipments and does not interfere with the electronic operation thereof. The general principle underlying automatic detection and classification is that the equipment shall use only properties of the sonar signal that are physically measurable, those that are functionally related to measurable physical properties of underwater targets and those which are concentrated about different values when different classes of target are present. This last requirement means that the variable must provide some degree of statistical discrimination. The most firmly established properties that meet these requirements are amplitude (relative to a suitable standard of background level), frequency (relative to reverberation frequency), echo length, and repetition within an interval of possible range change. The related target properties are target strength, radial speed, extent in range, and limited acceleration.

ADAC measures each sonar variable (compares it with a standard) instantly and continuously. ADAC makes use of doppler effect and echoes with no doppler effect hereinafter referred to as dopplered and undopplered signals. It does not report the measurements externally but subjects them to three criteria in succession. When all three criteria are met, it reports a submarine present. The first criterion is that either (1) the amplitude requirement for an undopplered signal is met or (2) the doppler requirement is met. The amplitude requirement for an undopplered signal is that the signal in the audio channel is greater by some fixed amount than the amplitude of the signal received on the video channel averaged over all bearings and reduced to a standard value. The doppler requirement is that there be a pulse of signal differing in frequency from the mean reverberation frequency by at least one half the reciprocal of the transmitted pulse length, lasting longer than the transmitted pulse, and having a certain minimum amplitude requirement generally different from that of undopplered echoes. Echo length is the second criterion of a submarine echo. Undopplered signals shorter than the transmitted pulse length (ping length) are rejected by attenuation in a narrow band filter. Dopplered signals shorter than the transmitted pulse length plus a constant are similarly rejected. Those echoes that meet the first criterion and get through the filters are clipped, measured, and rejected if they exceed a pre-determined length. The third criterion is that echoes that meet the first two criteria occur at the same range on two successive pings, allowing for the greatest possible change in range (of the order of ±100 yd). This criterion is applied by measuring the separation of the two successive echoes electronically.

The primary disadvantage of the Miller et al ADAC is in the comparison of the audio signal with the video signal as a reference. While the average signal over many transmitted intervals (ping intervals) in the two channels with a given audio beam direction would be related by a fixed or nearly fixed ratio, the signal amplitudes in the two channels, averaged over an interval of 250 to 1000 milliseconds, can be expected to differ significantly. This is a serious disadvantage of the method proposed in the Miller et al ADAC. This method also requires that the sonar receiver have a nearly constant average signal output in both the video and audio channels to activate the threshold devices that are used. Most of the sonars do not have this kind of output. The variable gain amplifiers in the sonars are not designed to produce such a wide range of gain. The alternative method mentioned in the Miller patent does not require the sonar set to have a wide range of gain, but the variable gain amplifier suggested as an alternative to the mixer has no provision for maintaining the signal at a constant average amplitude where this average must be constant over a desired period of 250 ms to 1 second.

A further disadvantage as a direct consequence of the above is that a great deal of attention must be given the device by an operator in adjusting or balancing of the relative gains of the audio and video channels.

Another major disadvantage of the Miller et al apparatus is found in the relay circuits. If there is a burst of noise or reverberation which passes the threshold and has proper length, but does not repeat in the proper range interval following the second ping, the relay circuits are not cleared until the third ping is emitted. This means that noise or reverberation bursts could be continually disabling the circuits without indication, and a target at a greater range would not be detected. The greater the range of a target the greater is the probability that the threshold will be exceeded at some shorter range. This means that the threshold would have to be set higher than is necessary with a system of clearing the circuits immediately after the greatest expected range has elapsed following the second ping.

The apparatus of this invention performs the same basic functions of the Miller et al patent. However, three basic improvements have been made. 1. A gain control loop was added to control the gain in both the video and audio channels, such that the average audio signal is constant but short time deviations of the audio signal from the average video signal (averaged over 360° or greater) are not significantly changed. This is accomplished in this invention by using a biased diode as a sampling device so that only the portion of the audio signal that exceeds the bias is amplified, rectified, filtered, and added to the bias on the variable gain amplifier in the video channel. This decreases the bias on the video amplifiers, increasing the gain of the video amplifiers so that the rectified and filtered output of the video amplifiers increases monotonically with both the "long time" average of the audio signal and the average video signal over 360°, (the filter criterion established for the Miller invention). This video output is used as a control bias on the variable gain audio amplifier so that the greater the video output the less the gain of the audio amplifiers. This is a change from the modification suggested in the Miller invention where the mixer is replaced by a variable gain amplifier. This improvement provides a constant or nearly constant mean amplitude at its output. 2. The circuits which perform the same functions as the relay circuits in the Miller invention are found in this invention. These functions are accomplished with vacuum tubes rather than relays, with the exception of the warning circuit, which is relay operated. The type of presentation may be visual, aural, or a combination of both, and may be presented in several locations simultaneously. 3. The doppler channel has been modified to include a heterodyne correlator and the circuits to establish the echo length and echo criterion of the no-doppler channel. The heterodyne correlator was added to attenuate noise bursts much shorter than the transmitted sonar pulse.

An object of this invention is the provision of an improved automatic detection and classification device (ADAC).

A further object of this invention is the provision of an improved sonar equipment monitor for the detection and classification of signals received by the sonar equipment.

Another object is the provision of an improved sonar equipment monitor which will indicate those targets returning echo pulses which meet certain requirements of amplitude, frequency, echo length and repetition within an interval of possible range change.

Still another object is the provision of an improved sonar equipment monitor having a gain control loop that provides a constant mean signal level (at a fixed level) regardless of range or bearing, the distribution of signal amplitude being approximately Rayleighly so that noise and reverberation will have the same amplitude as echoes from large objects with a given probability.

A further object is the provision of a sonar equipment monitor with a doppler signal channel circuit having means for establishing the echo length and echo criterion for passage of signals as in the no-doppler signal channel and use of filter techniques to attenuate noise bursts which are much shorter than the transmitted sonar pulse.

A still further object is the provision of a sonar monitor having electronic circuits which are self clearing and which are designed for simplicity, economy, minimum of error, repair and maintenance.

Figure 1:
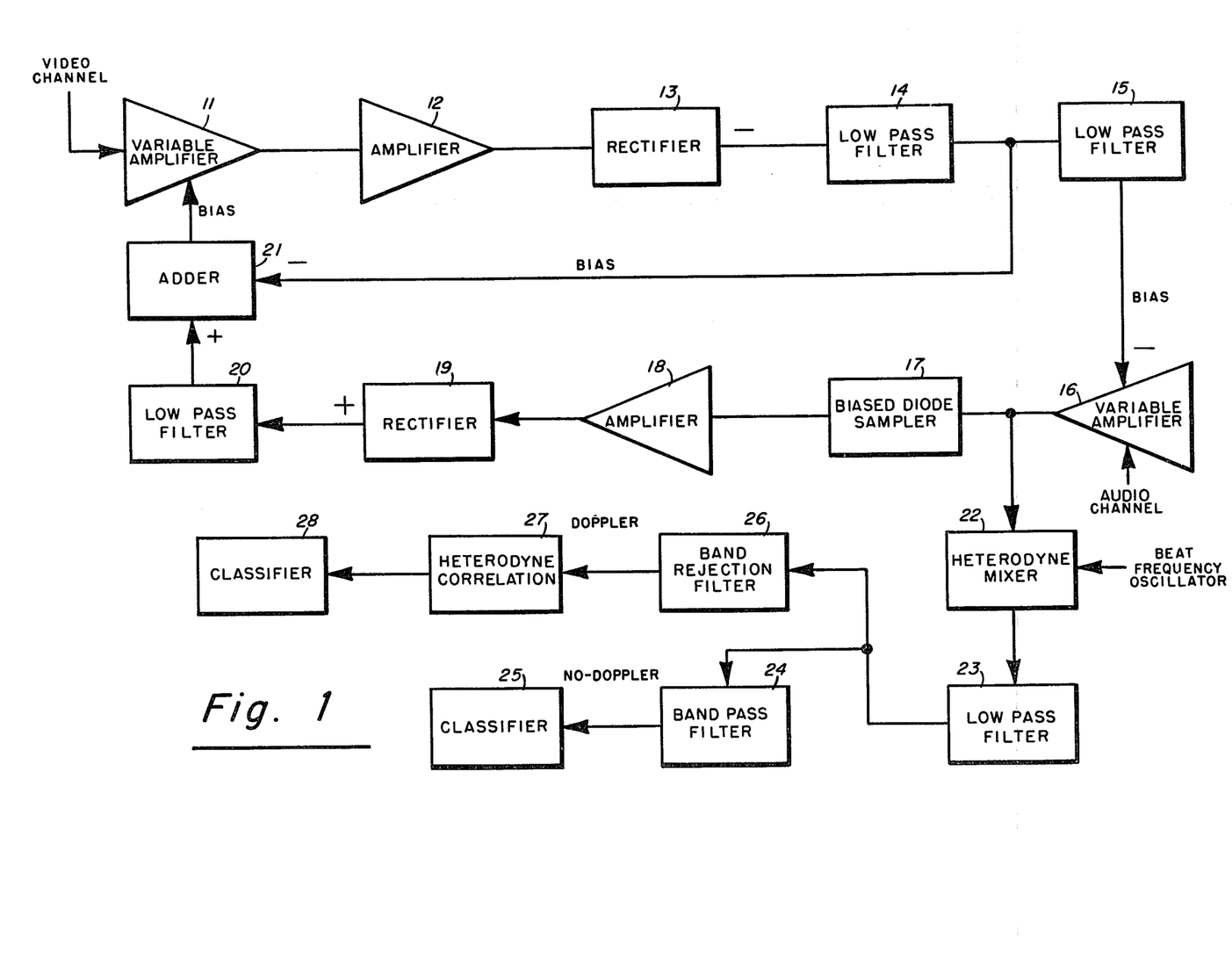
FIG. 1 is a block diagram of the components comprising the monitor of this invention.

Other objects and many of the attendant advantages of this invention will be readily appreciated as the same becomes better understood by reference to the following detailed description when considered in connection with the accompanying drawings wherein:

Referring now to the drawings in which like numerals designate like parts throughout, there is shown in FIG. 1 a block diagram of the ADAC connected to the video and audio channels of a sonar receiver and to the beat frequency oscillator (BFO) of the sonar.

The variable gain amplifier 11 receives an IF frequency signal from the video channel at a point preceding the second detector. (This is convenient in terms of signal processing). The output of amplifier 11 is fed to 12, a constant gain amplifier, the output of which is rectified in 13. The negative rectified IF signal is low pass filtered in 14, then fed simultaneously to another low pass filter 15 and to voltage adder 21.

The frequency response of filter 14 must be such that the loop gain through 11, 12, 13, 14 and 21 is less than one; furthermore, the frequency response of 11 and 12 should not be significantly changed by its addition if the d-c level at the output of filter 14 is held constant.

The output of low pass filter 15 will be the integral of the rectified IF signal over at least 360° of the video scan and preferably over a time comparable to the ping length of the sonar.

The output of filter 15 is a control bias fed to amplifier 16 a variable gain amplifier nearly identical to amplifier 11. The signal at the input of 16 is received from the audio channel of the sonar at the IF frequency.

The output of 16 is fed simultaneously to biased rectifier 17 (a diode) and heterodyne mixer 22.

The output of rectifier 17 is only that signal above the bias and this is amplified in 18, an amplifier with band pass greater than 1 KC for most sonars and centered at the IF frequency.

The output of 18 is rectified in 19 and the positive rectified output of 19 referenced to the output of filter 14 is low passed in filter 20, added in 21, and fed as a control bias to 11. The pass characteristic of filter 20 should be such that a step increase or decrease in signal at the input of 16 is not appreciably affected for at least 250 milliseconds and not much greater than one second.

This gain control loop 11–21 tends to make the output of amplifier 16 a constant average value regardless of range or bearing.

The amount of variation of the output of amplifier 16 from this ideal depends upon how good a constant output amplifier 11 is with its separate gain loop alone and how well the sample provided by the video channel approximates the level of signal received by the audio. The loops automatically adjust the video and audio gains so that the output of amplifier 16 averaged over periods between 0.25 to 1.0 seconds the average signal will be constant.

The output of amplifier 16 is fed to mixer 22 and heterodyned with the sonar BFO to provide own doppler nullification or with a separate Beat Frequency Oscillator which is shifted automatically to compensate for the Ships Doppler. The output of mixer 22 is low passed at 23 in the audio frequency region (less than 2 KC) and fed simultaneously to a band pass filter 24, that has a power spectrum response matched to the reverberation frequency (inverse pulse length) and to a band rejection filter 26 matched to reject the reverberation frequencies. The normalized power spectrum response of filter 26 should be ideally one minus the normalized power spectrum response of filter 24. The output of filter 26 goes to a heterodyne correlator 27 which works by splitting the signal and feeding part of it to a balanced modulator which produces side bands of the signal modulating a carrier. The other part of the signal is delayed by a delay line and heterodyned with one of the side bands produced by the balanced modulator to restore the carrier frequency. A type of heterodyne correlator that is suitable for operation in the circuit is disclosed in the patent to Feldman, U.S. Pat. No. 2,233,384. This carrier frequency goes through a narrow band filter which in conjunction with the delay line serves to reject signals or noise of short duration to improve the signal to noise ratio of the signal. The output of correlator 27 goes to classifier 28. There are two classifier units 25, 28, one connected to correlator 27, and one connected to filter 28. These are identical units which in operation are adjusted independently.

Two separate units 25, 28 must be used because the signal processing system considers these two independent sets of signals. These are the dopplered signals and the non-dopplered signals. These two channels convey more information and increases the signal to background ratio of each channel. This is why the various filters are used in the circuits preceding these classifiers.

Figure 2:
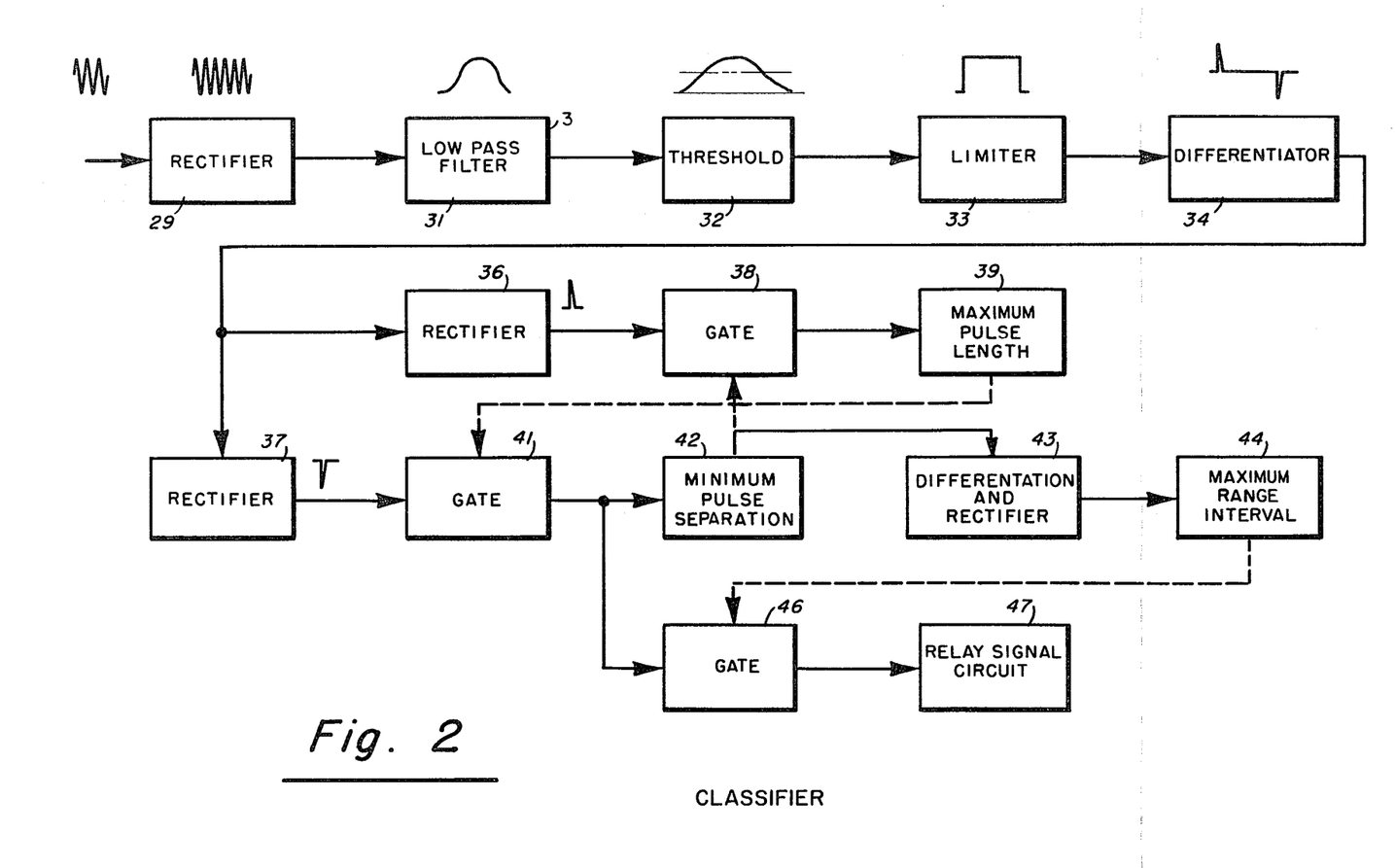
FIG. 2 is a block diagram of the classifier.
Figure 3:
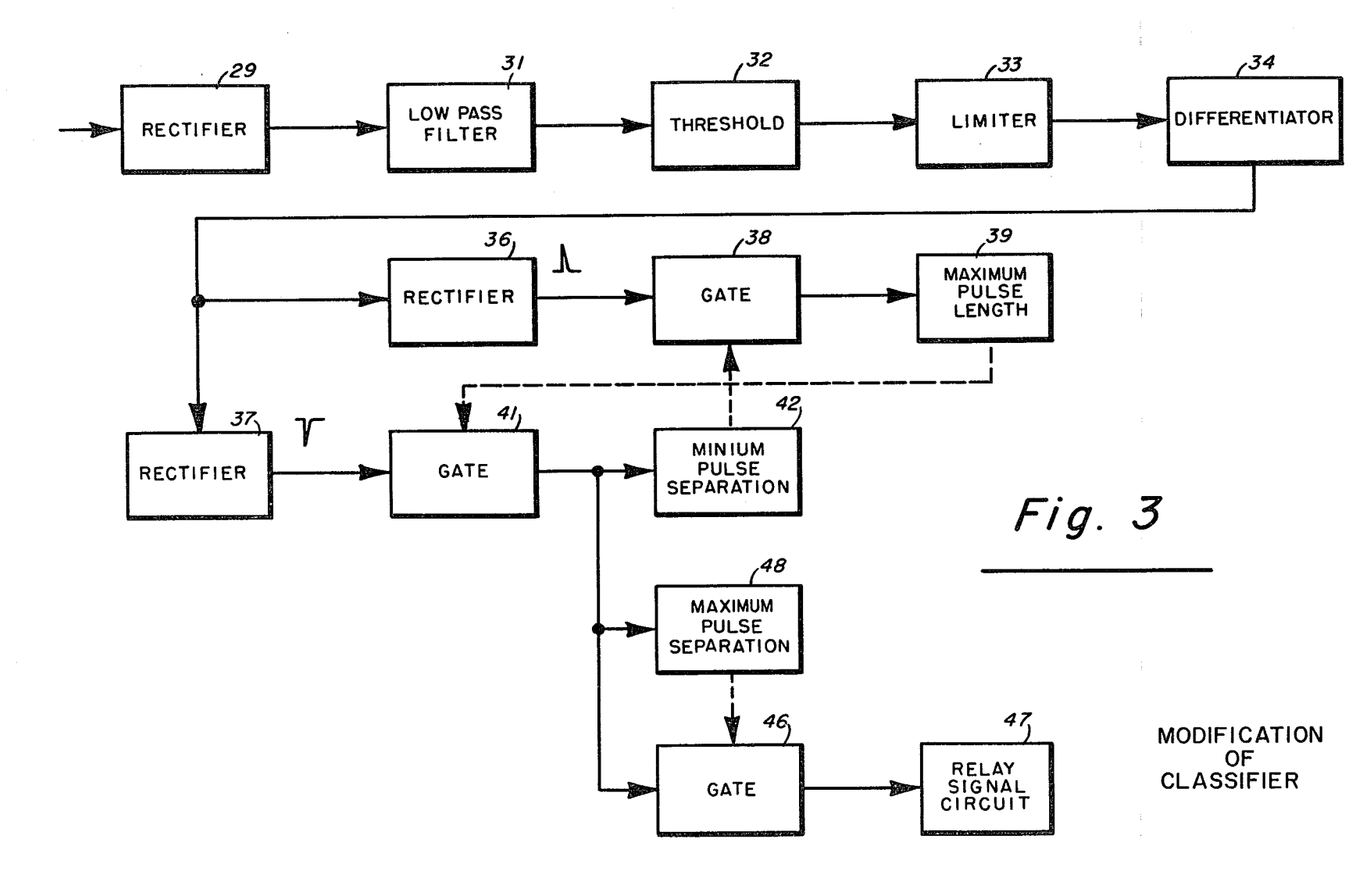
FIG. 3 is a block diagram of a modification of the classifier.

A clearer picture of the content and function of these classifiers will be seen with reference to FIG. 2 and FIG. 3. Referring now to FIG. 2, the signal fed into the classifier is rectified in 29, low pass filtered in 31 to remove the high frequencies and fed to the threshold control 32. The portion of the signal above the threshold setting is fed to limiter 33, a high gain amplifier whose output is a rectangular pulse with a length as long as that portion of the envelope of the signal above threshold.

The output of the limiter is differentiated so that a short (compared to the signal out of the limiter 33) positive pulse at the beginning of the pulse out of the limiter and a short negative pulse at the end of the limited pulse is fed to two rectifiers 36, 37. One 36 passed only the positive leading edge pulse to gate 38 which is normally open. The output of gate 38 triggers the maximum pulse length determining circuit 39 which opens gate 41 only for a length of time corresponding to the longest acceptable signal.

Rectifier 37 passes only the negative trailing edge pulse to gate 41. If gate 41 is open, the negative pulse triggers the minimum acceptable pulse separation circuit 42 which closes gate 38 for the time corresponding to the minimum separation of the order of 250 milliseconds less than the ping interval of the sonar but varying around this figure depending on the range scale, and the maximum expected closing or opening range rate. The gating pulse of 42 is also fed to 43, which differentiates and rectifies the differentiated pulse so that the trailing end of the gating pulse of 42 triggers the maximum range interval circuit 44 through 43, a differentiator and rectifier. 44 opens gate 46 allowing a signal from 41 to pass through to the relay circuit 47.

Figure 4:
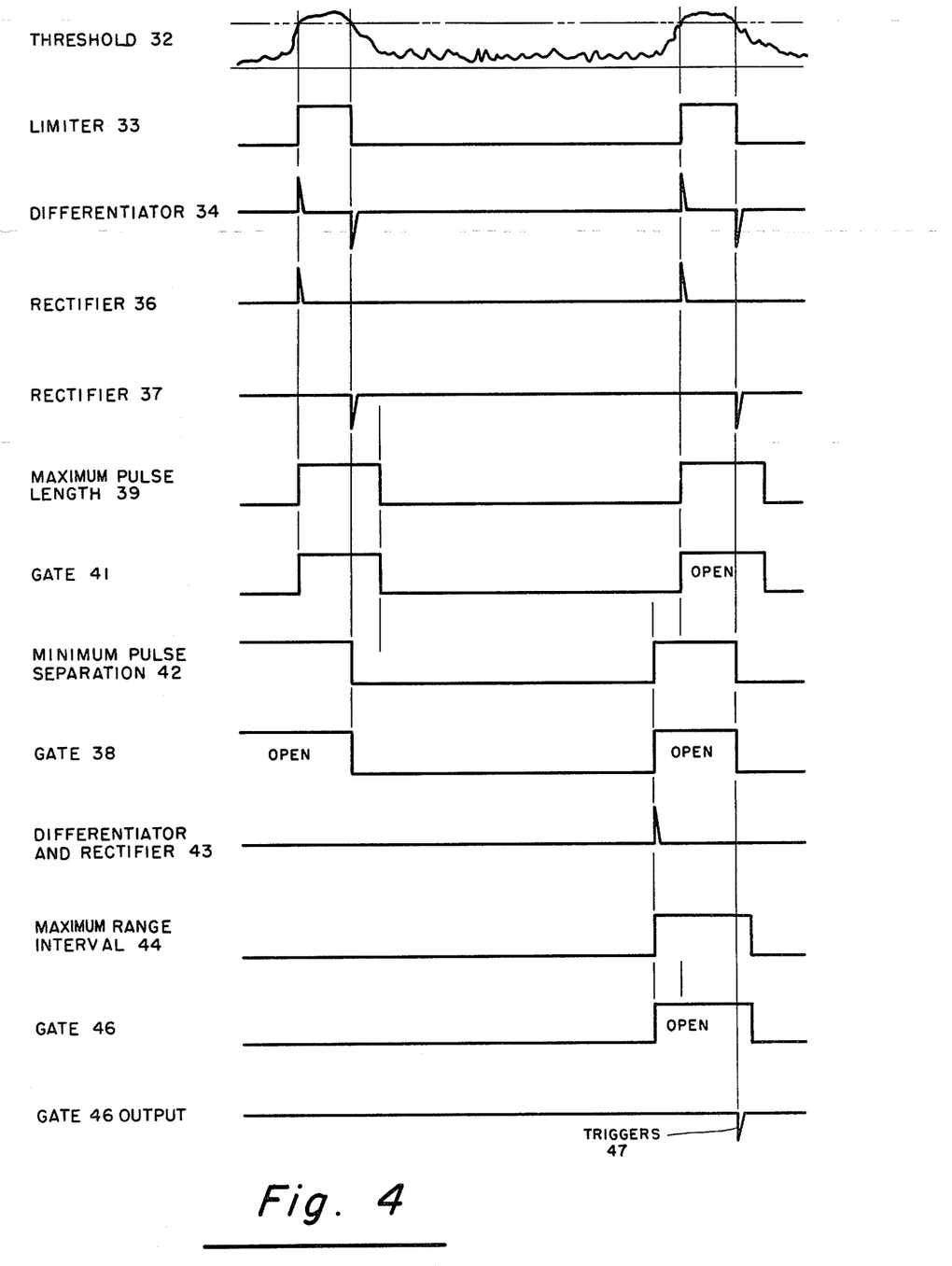
FIG. 4 shows the time sequence of target signal processing by the classifier.

Reference is now made to the time sequence of signal processing shown in FIG. 4. When a signal has an amplitude greater than the threshold, is within the length limit, and re-occurs within the correct range interval, the sequence of events in the classifier is shown. "Length limit" identifies the maximum length of time an echo pulse can be of an amplitude above the threshold amplitude and still cause a pulse to pass through gate 41.

Figure 5:
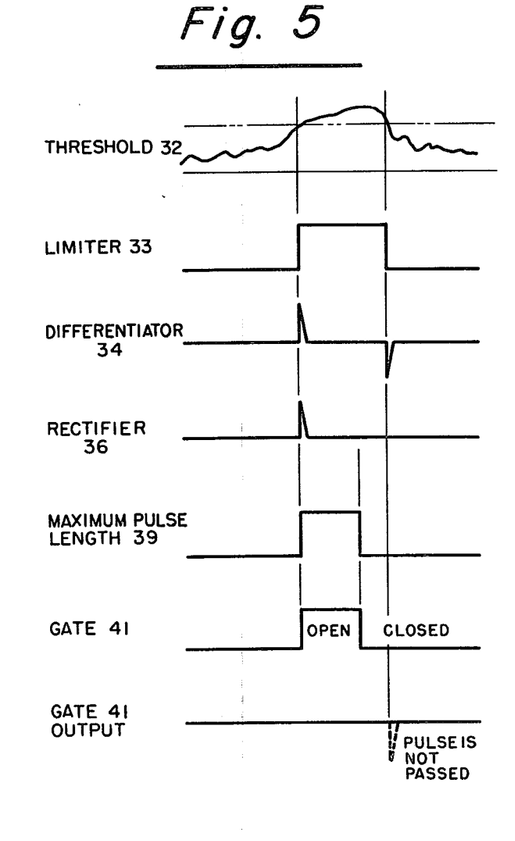
FIG. 5 shows how signals that are too long are eliminated.
Figure 6:
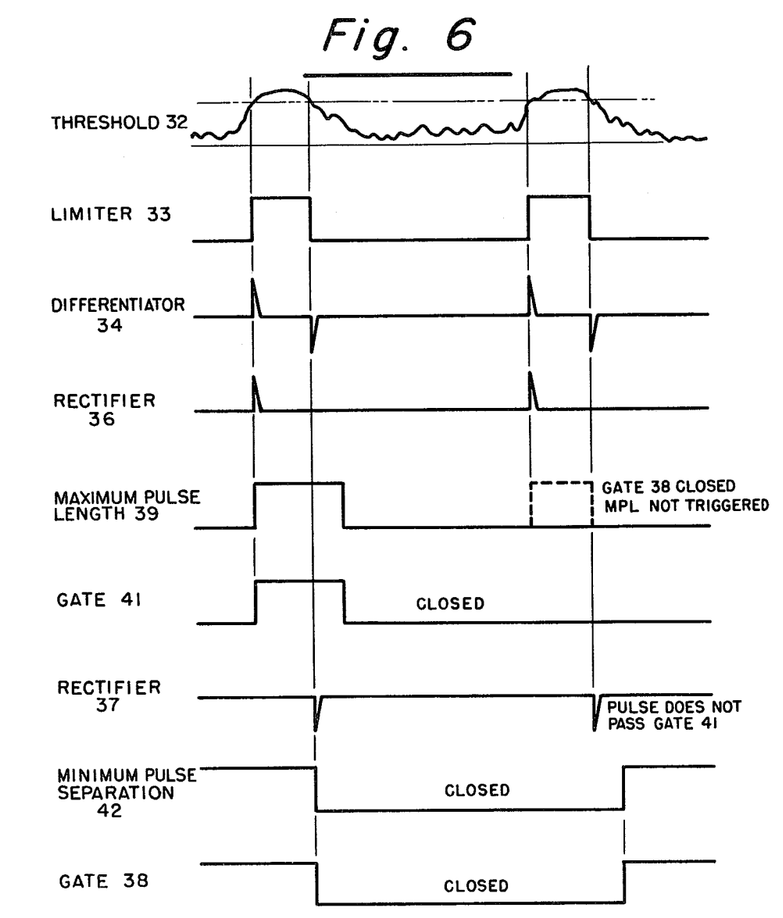
FIG. 6 shows how signals that occur too early are eliminated.
Figure 7:
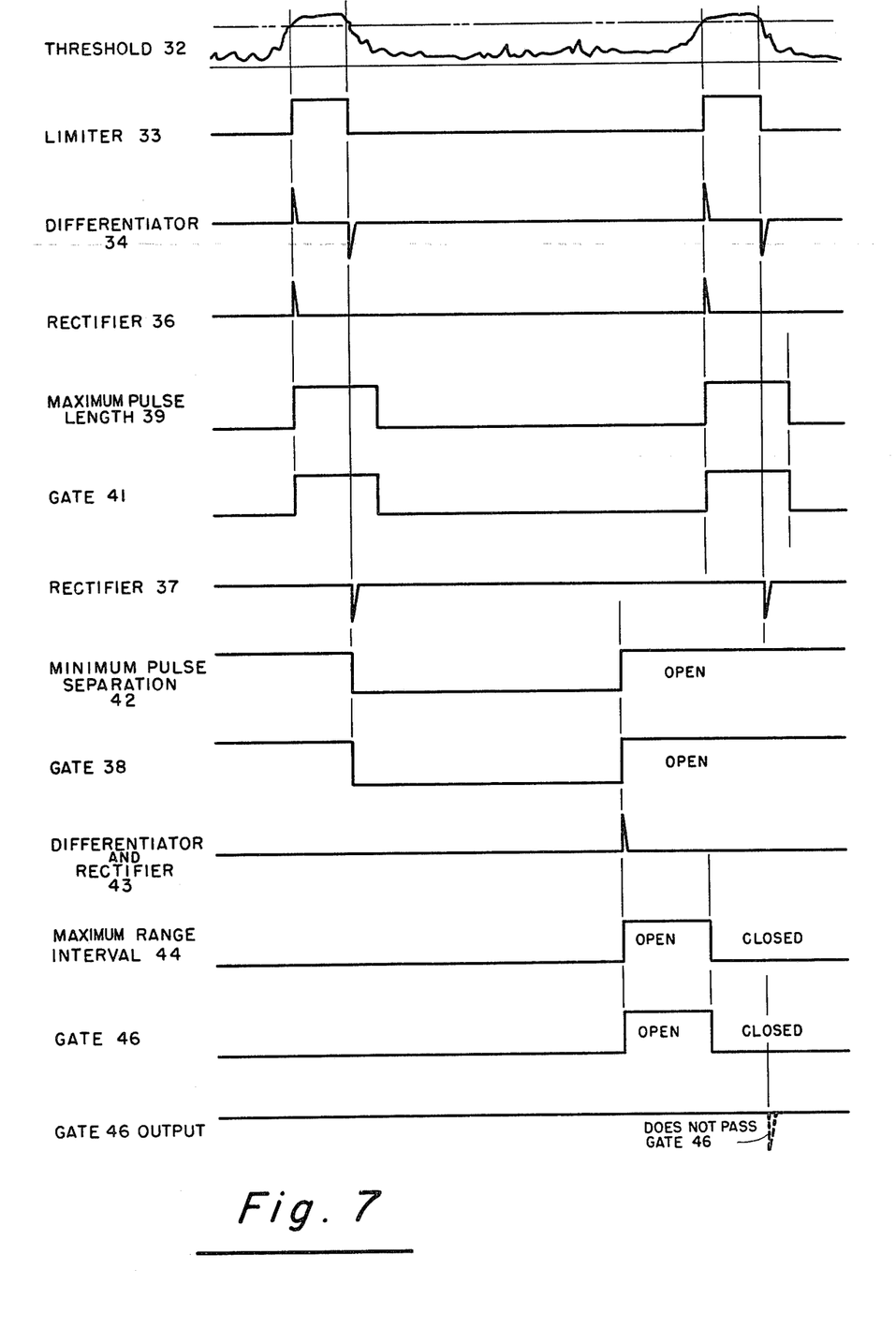
FIG. 7 shows how signals that occur too late are eliminated.

FIG. 5 shows the sequence of events for a signal whose amplitude is greater than the threshold but is too long. Note that gate 41 closes before the tail end of the signal can get through and hence the following circuits are not energized; thus, the classifier is again ready to process further signals. FIG. 6 shows a signal that re-occurs too early. It is noted that the sequence of operation in the classifier continues until gate 38 is again open. The second signal has already occurred, however, before the gate opens and the pulse from 36, therefore, does not get through 38 to trigger 39. Thus, the classifier again is returned to quiescence and ready to process other signals having rejected the previous set. FIG. 7 shows a signal re-occurring too late. It is noted that all processes are the same as in FIG. 4 except that gate 46 has opened and closed before the end of the second signal so this is also rejected.

Thus, the activation of the signal circuit 47 says that (1) a signal is above a minimum acceptable amplitude with respect to the average reverberation or it has doppler; (2) it has a pulse length greater than the transmitted pulse and less than the longest expected echo from a submarine; and (3) it has occurred within acceptable range limits on two successive pings. ADAC will have value to the extent that submarine echoes meet these criteria and noise, reverberation, and echoes from other classes of targets do not. Table 1 shows how several kinds of non-submarine targets and submarines at various aspects are expected to meet the criteria. In the table, "I" means the target meets the criterion; "O" means it does not. Table 1 shows that a properly adjusted ADAC should confuse submarine echoes only with undopplered echoes from small objects.

TABLE 1

| Target | Criterion | | |
|---|---|---|---|
| | 1 | 2 | 3 |
| Submarine | 1 | 1 | 1 |
| Whales (no doppler) | 1 | 1 | 1 |
| (doppler) | 1 | 0 | 1 |
| Kelp | 1 | 1 or 0 | 1 |
| Fish (no doppler) | 1 | 1 | 1 |
| (doppler) | 1 | 0 | 1 |
| Pinnacles, wrecks, rocks | 1 | 1 | 1 |
| Bottom, non-localized | 1 | 0 | 1 |
| Canyon walls | 1 | 0 | 1 |
| Reverberation | 0 | 0 | 1 |
| Noise spikes | 1 | 0 | 0 |

A modification of the classifier is shown in FIG. 3. Here the maximum range separation circuit 48 is triggered directly from 41. Its time then would be the time of 42 in FIG. 2 plus the time of 44 in FIG. 2. It would have to open gate 46 such that the signal from 41 triggering 48 would not pass through gate 46, but the next signal coming through would. The output of gate 46 triggers the relay signal circuit 47 as before. This modification of the classifier performs the same functions as the other except that the first (FIG. 2) has the advantage that only the first of a series of repeated echoes passing the range criterion cannot energize the signaling circuit whereas the second described classifier (FIG. 3) has an output with every other (alternate) echo.

The advantages of the apparatus of this invention are now apparent. The gain control loop 11–21 in FIG. 1 provides a very nearly fixed average level of reverberation and noise at the output of 13. Since the sea noise and reverberation have a Rayleigh amplitude distribution, a threshold control can be set such that the noise and/or reverberation will exceed this level with a known probability. Slow fluctuations between the average video and average audio signal of length or period greater than the longest expected echo are compensated for. This means that if the propagation losses are different from bearing to bearing or more scatterers are found at one bearing than the others, or the overall signal level changes in one channel as compared with the other, the gain of the audio channel is automatically and continually adjusted. The addition of this gain control loop and the other improvements means that the device requires less attention of personnel in operation. The electrode circuits that replace functionally the relay circuits in the Miller invention are self clearing after a random or false signal above the threshold which has not met the range criterion. This means that the device is again alert. With low threshold settings or a high reverberation at short ranges which do not meet the successive echo criterion the device will work successively to greater ranges if many "false" echoes were encountered in successive pings. This would take as many ping intervals as there were false echoes.

In the preferred model the output of the variable gain amplifier is sampled by a biased diode and peaks exceeding the bias are amplified, rectified, filtered, and added as a control bias on the video amplifiers. The biased diode 17, amplifier 18, and rectifier 19 could be omitted if a square law amplifier were put in their place if the output of the square law amplifier were adjusted such that (1) there would be no output if the power output of 16 were below a given arbitrary value (fixed by the design of the following circuits), (2) the voltage output of the square law amplifier would be a positive voltage (with respect to the reference negative voltage supplied the adder from filter 14) proportional to the power output of 16 in excess of the arbitrary value, or (3) the voltage output of the square law amplifier be referenced to the voltage output from filter 14 and be proportional to the difference between the reference and the output of amplifier 16 such that the voltage would be positive when the power exceeded the reference and negative when it was less. In either of these cases the output of the square law amplifier would be connected to low pass filter 20.

The heterodyne mixer 22 and low pass filter 23 are not needed if some means of Doppler nullification is provided before the input to the variable gain amplifier 16 and the band pass filter 24 can be made narrow enough (the reciprocal of the pulse length) at these frequencies (the IF frequency of the sonar) or around the transducer frequency. ADAC can be used with non-scanning (searchlight) sonars by feeding signals from a non-directional transducer, or a transducer that includes more than the audio receiving beam if the transmitted beam is wider, into the video channel. Ideally, the signal fed into ADAC should come from beams immediately adjacent the "audio beam". A modification in the classifier is to calibrate the minimum echo separation circuit in terms of own ship speed and direction of audio beam. That is the separation of two echoes will be the least looking toward the bow and the greatest looking toward the stern.

Obviously many modifications and variations of the present invention are possible in the light of the above teachings. It is therefore to be understood that within the scope of the appended claims the invention may be practiced otherwise than as specifically described.

What is claimed is:

1. In an automatic echo ranging system wherein sonar equipment transmits pulses toward a target in predetermind and equal time intervals and receives background, dopplered and undopplered echoes which are produced as video output and audio output, the improvement comprising a gain circuit for controlling the amplitude of the video and audio output, which includes a video channel for the video output of the receiver having a first variable amplifier and means for producing a first bias voltage which is proportional to the video signal voltage, an audio channel for the audio output of the receiver including a second variable amplifier and means for producing a second bias voltage which is proportional to the audio channel signal voltage, said first bias voltage from the video signal being received by said second variable amplifier in the audio channel and said second bias voltage from the audio channel being received by the first variable amplifier in the video channel, a band pass filter and a band rejection filter for the audio output from the second variable amplifier to provide an undopplered signal voltage channel and a dopplered signal voltage channel, classifier means for the dopplered channel and the undopplered channel, said classifier means including means for rectifying, and means for filtering the signals from each channel to remove high frequencies, means for passing a signal above a predetermined amplitude, a wave shaper, a differentiator for the output of the wave shaper to produce a positive and negative pulse from one echo from a target, a first rectifier and a first normally open gate for passage of the positive pulse of the one echo, a second rectifier for passing the negative pulse of the one echo, a second normally closed gate, a maximum pulse length circuit operative by the positive pulse of the one echo to open the second gate for a predetermined time to pass the negative pulse of the one echo, a minimum pulse separation circuit operative by the negative pulse of the one echo to close said first gate for a predetermined minimum range interval of the next echo from the target, a third normally closed gate, a maximum pulse separation circuit operative by the negative pulse of the first echo to open the third gate for the maximum range interval of said next echo from the target, and a relay signal circuit operated when the negative pulse of said next echo from the target passes the third gate to indicate that a target has been located.

2. In an automatic echo ranging system wherein sonar equipment transmits pulses toward a target in predetermind and equal time intervals and receives background, dopplered and undopplered echoes which are produced as video output and audio output, the improvement comprising a gain circuit for controlling the amplitude of the video and audio output which includes a video channel for the video output of the receiver having a first variable amplifier, rectifier and filter means in series for producing a first bias voltage which is proportional to the video signal voltage, an audio channel for the audio output of the receiver including a second variable amplifier, a diode sampler, amplifier, rectifier and filter in series for producing a second bias voltage which is proportional to the audio signal voltage, said first bias voltage signal being received by said second variable amplifier in the audio channel and said second bias voltage from the audio channel being received by the first variable amplifier in the video channel, a hetrodyne mixer and a low pass filter for the output of the second variable amplifier, a band pass filter and a band rejection filter for the audio output from said low pass filter to provide an undopplered signal voltage channel and a doppolered signal voltage channel, a hetrodyne correlator in the dopplered signal channel, an independent classifier for the dopplered channel and an independent classifier for the undopplered channel; each classifier including means for rectifying, and means for filtering the signals from each channel to remove high frequencies, means for passing a signal above a predetermined amplitude, a wave shaper, a differentiator for the output of the wave shaper to produce a positive and negative pulse from one echo from a target, a first rectifier and a first normally open gate for passage of the positive pulse of the one echo, a second normally closed gate, a maximum pulse length circuit operative by the positive pulse of the one echo to open the second gate for a predetermined time to pass the negative pulse of the one echo, a minimum pulse separation circuit operative by the negative pulse of the one echo to close said first gate for a predetermined minimum range interval of the next echo from the target, a third normally closed gate, a maximum pulse separation circuit operative by the negative pulse of the first echo to open the third gate for the maximum range interval of said next echo from the target, and a relay signal circuit operated when the negative pulse of said next echo from the target passes the third gate to indicate that a target has been located.

* * * * *